United States Patent
Hofer et al.

(10) Patent No.: US 11,881,731 B2
(45) Date of Patent: Jan. 23, 2024

(54) CONTROL SYSTEM FOR A BATTERY SYSTEM

(71) Applicant: Samsung SDI Co., Ltd., Yongin-si (KR)

(72) Inventors: Maximilian Hofer, Hartberg (AT); Roland Klobasa, Graz (AT); Gernot Kraberger, Graz (AT)

(73) Assignee: SAMSUNG SDI CO., LTD., Yongin-si (KR)

( * ) Notice: Subject to any disclaimer, the term of this patent is extended or adjusted under 35 U.S.C. 154(b) by 375 days.

(21) Appl. No.: 17/228,038

(22) Filed: Apr. 12, 2021

(65) Prior Publication Data

US 2021/0328445 A1  Oct. 21, 2021

(30) Foreign Application Priority Data

Apr. 15, 2020  (EP) .................................. 20169591
Apr. 6, 2021  (KR) ........................ 10-2021-0044760

(51) Int. Cl.
*H04B 10/00* (2013.01)
*H02J 7/00* (2006.01)
*H04B 10/69* (2013.01)

(52) U.S. Cl.
CPC ........ *H02J 7/00032* (2020.01); *H02J 7/0047* (2013.01); *H04B 10/69* (2013.01); *H02J 2207/20* (2020.01)

(58) Field of Classification Search
CPC .. H02J 7/00032; H02J 7/0047; H02J 2207/20; H02J 7/0013; H02J 13/00019; H04B 10/69; H04B 10/801; Y02T 10/70
See application file for complete search history.

(56) References Cited

U.S. PATENT DOCUMENTS 5,619,417 A  *  4/1997  Kendall ............. G01R 31/3648
                                                    701/22
6,384,662 B1     5/2002  Thiel et al.
(Continued)

FOREIGN PATENT DOCUMENTS

EP    1 628 416 A1   2/2006
EP    2 858 210 A2   4/2015
(Continued)

OTHER PUBLICATIONS

Extended European Search Report issued in corresponding EP Application No. 20169591.3, dated Oct. 8, 2020, 7 pages.
(Continued)

*Primary Examiner* — Agustin Bello
(74) *Attorney, Agent, or Firm* — Lewis Roca Rothgerber Christie LLP

(57) ABSTRACT

A control system for a battery system is provided. The control system includes a master controller and a slave controller using light-based communication. The master controller includes a light source and a transmission controller controlling the light source, and the slave controller includes a photo-sensitive element, a wake-up circuit, a power supply node, and a receiver circuit. The photo-sensitive element receives the light signals emitted by the light source and, in response to receiving a wake-up light signal, outputs a wake-up signal to the wake-up circuit, and in response to receiving the wake-up signal from the photo-sensitive element, the wake-up circuit connects the receiver circuit to the power supply node or to the photo-sensitive element. When the receiver circuit is connected to the power supply node and the photo-sensitive element, the receiver circuit receives an operation voltage from the power supply node and receives reception signals from the photo-sensitive element.

15 Claims, 5 Drawing Sheets

(56) References Cited

U.S. PATENT DOCUMENTS

| | | | |
|---|---|---|---|
| 6,681,080 B1 | 1/2004 | Pammer et al. | |
| 10,338,224 B2* | 7/2019 | Eken | H03F 1/08 |
| 2006/0034611 A1 | 2/2006 | Li | |
| 2006/0188254 A1* | 8/2006 | Schorpp | H04B 10/801 |
| | | | 398/33 |
| 2010/0166431 A1* | 7/2010 | Wu | H04B 10/69 |
| | | | 398/202 |
| 2012/0074852 A1 | 3/2012 | Delnoij | |
| 2014/0210420 A1* | 7/2014 | Lee | H02J 7/0068 |
| | | | 320/134 |
| 2015/0097525 A1* | 4/2015 | DeDona | B60L 1/006 |
| | | | 320/109 |
| 2018/0348709 A1* | 12/2018 | Jaeggi | G04C 11/02 |
| 2019/0229376 A1* | 7/2019 | Petrakivskyi | H01M 10/486 |
| 2019/0356510 A1* | 11/2019 | Lee | H04L 12/40045 |
| 2020/0213141 A1* | 7/2020 | Zondag | H04L 12/10 |
| 2020/0295832 A1* | 9/2020 | Bai | H04B 10/27 |
| 2020/0408831 A1* | 12/2020 | Yoon | G06F 11/0757 |
| 2021/0083792 A1* | 3/2021 | Magri | H04J 14/0282 |
| 2021/0306950 A1* | 9/2021 | Van Weeren | H04B 11/00 |
| 2021/0328445 A1* | 10/2021 | Hofer | H04B 10/801 |
| 2022/0126724 A1* | 4/2022 | O'Connor | H02J 7/0063 |

FOREIGN PATENT DOCUMENTS

| | | |
|---|---|---|
| WO | WO 99/03219 A1 | 1/1999 |
| WO | WO 00/14889 A1 | 3/2000 |
| WO | WO 2010/140094 A1 | 12/2010 |

OTHER PUBLICATIONS

European Office action issued in corresponding application No. EP 20 169 591.3, dated Feb. 16, 2023, 5 pages.

* cited by examiner (A)                           (B)

CONTROL SYSTEM FOR A BATTERY SYSTEM

CROSS-REFERENCE TO RELATED APPLICATION

This application claims priority to and the benefit of European Patent Application No. 20169591.3, filed in the European Patent Office on Apr. 15, 2020, and Korean Patent Application No. 10-2021-0044760, filed in the Korean Intellectual Property Office on Apr. 6, 2021, the entire content of both of which is incorporated herein by reference.

BACKGROUND

1) Field

Aspects of embodiments of the present disclosure relate to a control system for battery system.

2) Background of the Related Art

A rechargeable (or secondary) battery differs from a primary battery in that it is designed to be repeatedly charged and discharged, while the latter provides an irreversible conversion of chemical to electrical energy. Low-capacity rechargeable batteries may be used as a power supply for small electronic devices, such as cellular phones, notebook computers, and camcorders, while high-capacity rechargeable batteries may be used as a power supply for hybrid and electric vehicles and the like.

Generally, rechargeable batteries include an electrode assembly including a positive electrode, a negative electrode, and a separator interposed between the positive and negative electrodes, a case receiving (or accommodating) the electrode assembly, and electrode terminals electrically respectively connected to the positive and negative electrodes of the electrode assembly. An electrolyte solution is injected into the case to enable charging and discharging of the battery via an electrochemical reaction of the positive electrode, the negative electrode, and the electrolyte solution. The shape of the case, for example, a cylindrical or prismatic shape, depends on the battery's intended purpose. Rechargeable batteries may be used as (or included in) a battery module including a plurality of unit battery cells coupled to each other in series and/or in parallel to provide relatively high energy density, for example, high voltage and capacity, for, as an example, an electric vehicle. The battery module may be formed by interconnecting the electrode terminals of the plurality of unit battery cells, the number and connection configuration of which depends on a desired amount of power, to provide a high-power rechargeable battery for, as an example, an electric vehicle. Battery modules are mechanically and electrically integrated, equipped with a passive or active thermal management system, and configured for communication with electrical loads to form a battery system. Aspects of such mechanical and electric integration and thermal management may not be necessary for one skilled in the art to have a complete understanding of the present disclosure and, thus, may be omitted.

Battery modules may be constructed either in block design or in modular design. In the block design, each battery cell is coupled to a common current collector structure and a common battery system manager. In the modular design, pluralities of battery cells are connected to each other to form submodules, and several submodules are connected to each other to form the battery module. Battery management functions may be provided either on the module or submodule level and, thus, interchangeability of the components is improved. One or more battery modules are mechanically and electrically integrated, equipped with a thermal management system, and configured for communication with one or more electrical consumers to form a battery system.

Static control of the battery power output and charging may not be sufficient to meet the dynamic power demands of the various electrical loads connected to the battery system. Thus, steady or intermittent exchange of information between the battery system and the controllers of the electrical consumers may be used. This information includes the battery system's actual state of charge (SoC), potential electrical performance, charging ability, and internal resistance as well as the consumer's actual or predicted power demands or surpluses.

To monitor, control, and/or set the aforementioned parameters, a battery system usually includes one or more a battery system monitor (BSM), a battery disconnect unit (BDU), and a battery module monitor (BMM). Such control units may be an integral part of the battery system and disposed within a common housing or may be part of a remote control unit communicating with the battery system via a suitable communication bus. In the context of this disclosure, the BSM may also be referred to as a battery system manager, and a battery module monitor may also be referred to as a battery module manager.

These control units may perform various functions in the battery system. For example, a BMM may be provided on battery module or submodule level and configured to measure cell voltages and temperatures and to provide cell balancing within (or between) the modules. A plurality of BMMs is usually connected for data transmission among each other and with a BSM, and the BMS usually receives the measured data, such as voltage data, from all of the battery modules, controls the battery system as a whole, and provides a communication interface to an exterior of the battery system for communicating with the electrical consumers, for example, via a suitable communication bus, such as a CAN or SPI interface.

The BSM is usually coupled to a controller of one or more electrical consumers as well as to each of the BMMs of the battery modules in the battery system. For a single BSM to control a plurality of battery modules, a daisy chain setup may be used. In such a setup, the BSM, as master, is connected for communication in series to a plurality of battery modules, such as to the plurality of battery module monitors (BMMs) of the battery modules, as slaves. Daisy chain setups and corresponding protocols are known in the relevant art.

An exemplary battery system having a daisy chain setup according to the related art is illustrated in FIG. 1. Therein, a BSM 1 is configured to communicate with a plurality of BMMs 2 of battery modules, and each battery module includes a negative module terminal 3 and a positive module terminal 4 that are connected to the respective BMM 2 to supply the BMM 2. The module terminals 3, 4 of different battery modules are power connected to each other via busbars 5, and peripheral module terminals 3, 4 are power connected to system terminals 6, 7, respectively. Each BMM 2 includes a connector 8 to daisy chain with the BSM 1, which also includes a connector 8 using a wiring harness 9 connecting the all of the connectors 8 with each other in a serial configuration.

The wiring harness 9, which is a wire-based connection, is subject to failure or interference by electro-magnetic disturbances and are sources for EM disturbances themselves. Hence, screening or EMI shielding of the wiring harness 9 is used, which further limits the already restricted construction space for the wiring harness 9. Also, the ohmic resistance of the wiring harness leads to undesired heating and power losses and increases the material and assembly costs of the wire harness, which increase overall costs.

BRIEF SUMMARY

To avoid some of the above issues, light-based (or optical) communication may be used in a battery system. However, in utilizing light-based communication, the problem of wake-up of the BMMs 2, which are operated as the slave control units, occurs. In the wire-based control system shown in FIG. 1, a wake-up can be performed over the communication lines, in which wake-up energy is transmitted from the master (BMS) to the slaves (BMMs) via the wiring harness 9. However, in optical communications, such as in optical communications using relatively low-energy infrared light, such a wake-up process may lead to an erroneous wake-up operation. Further, keeping the BMMs 2 active at all times, at least with respect to their wake-up circuits, would contribute significantly to the power consumption of the battery system because the battery system is usually not charged in sleep mode, leading to a decreased lifetime of the battery system as a whole.

Aspects of embodiments of the present disclosure overcome or mitigate at least some of the drawbacks of the prior art and provide a control system for a battery system utilizing light-based communication that allows for a reliable wake-up process and reduced energy consumption.

One or more of the drawbacks of the prior art can be avoided or at least mitigated according to aspects of the embodiments of the present disclosure. For example, a control system for a battery system is provided that includes a master control unit (e.g., a master controller) and at least one slave control unit (e.g., a slave controller) that are configured to perform light-based communication with each other. The master control unit and the at least one slave control unit may have different functions in the battery system. For example, the master control unit may be a BSM or BMS, and the at least one slave control unit may be one of a BMM, BDU, or cell supervision circuit (CSC).

According to embodiments of the present disclosure, the master control unit includes a light source and a transmission controller. Therein, the light source might be a light-emitting diode, a light-bulb, a laser source, or the like. The transmission controller may be configured to selectively operate the light source to transmit a transmission signal via at least one light signal output by the light source. For example, the transmission control may be configured to encode the transmission signal and to modulate the encoded transmission signal to a light signal.

The at least one slave control unit of the control system according to an embodiment of the present disclosure includes a photo-sensitive element configured to receive light signals emitted by the light source. During normal operation of the slave control unit, the photo-sensitive element is configured to output a reception signal to a receiver circuit of the slave control unit based on (e.g., according to) a light signal. The receiver circuit is configured to further process the reception signal, and such further processing may include demodulating and decoding of the reception signal. The photo-sensitive element may be a photo-diode or a photo-transistor.

Aspects of embodiments of the present disclosure are directed to the operation of the slave control circuit during a sleep mode (e.g., an idle mode), when power consumption of the save control circuit should be low. The present disclosure, according to one embodiment, is directed to the transition between the sleep mode of the slave control unit and the normal operation mode of the slave control unit. Therefore, in the context of the present disclosure, the description of the slave control unit primarily focuses on those aspects and components that are important for such transition between a sleep and a normal operation mode.

In one embodiment, the photo-sensitive element of the slave control unit is configured to output a wake-up signal to a wake-up unit in response to receiving a wake-up light (e.g., a wake-up light signal) emitted by the light source of the master control unit, for example, while receiving such a light signal while the slave control unit is in sleep mode. The wake-up unit of the slave control unit is configured to connect the receiver circuit to at least one of a power supply node of the slave control unit and the photo-sensitive element in response to receiving the wake-up signal. For example, the wake-up unit is configured to selectively connect the receiver circuit to its power supply and/or to the photo-sensitive element in response to the wake-up signal, and in sleep mode, the receiver circuit is not connected to (e.g., is disconnected from) at least one of those elements.

The power supply node is configured to supply an operation power (e.g., an operation voltage) for the receiver circuit to the receiver circuit when electrically connected thereto. Further, the photo-sensitive element is configured to transmit reception signals to the receiver circuit for further processing when electrically connected thereto. For example, when the receiver circuit is connected to both the power supply node and the photo-sensitive element, the receiver circuit is able to perform in a normal operation mode. Whether or not the wake-up unit selectively connects one or both of the power supply node and the photo-sensitive element to the receiver circuit depends on whether one or both of those elements is disconnected from the receiver circuit when the slave control unit is in sleep mode. For example, if both of those elements are disconnected in sleep mode, the wake-up unit connects both of those elements to the receiver circuit in response to the wake-up signal. Otherwise, the wake-up unit connects the disconnected element in response to the wake-up signal.

The slave control circuit, according to embodiments of the present disclosure, allows for the decoupling of the processing of reception signals in the receiver circuit and the transition from a sleep mode to a normal operation mode by providing a separate wake-up unit (e.g., a wake-up circuit) that is configured to selectively bring the receiver circuit into its normal operation mode based on a low energy wake-up signal. For example, in designing the receiver circuit, any constrains resulting from such wake-up operation need not be considered, for example, while dimensioning circuit components.

Further, by separating the wake-up function from the normal operation mode, no power supply at all is required for the receiver circuit during sleep mode. Further, the wake-up unit may be configured to selectively connect the power supply node and/or the photo-sensitive element to the receiver circuit in response to receiving a low-energy wake-up light signal.

In an embodiment of the control system, the wake-up unit includes a switch element (e.g., a switch) and a latching element (e.g., a latch). Therein, the photo-sensitive element is configured to output a set signal as the wake-up signal to the latching element in response to receiving the wake-up light signal. Further, the latching element is configured to control the switch element to be conductive in response to receiving the set signal from the photo-sensitive element. Therefore, the latching element outputs a switch control signal, and the outputting of the switch control signal starts with receiving the set signal and is continued (e.g., maintained or latched) until receiving a reset signal. Further, the switch element may be interconnected between the receiver circuit and one of the photo-sensitive element and the power supply node. Further, the other one of the photo-sensitive element and the power supply node may be fixedly connected (e.g., permanently connected) to the receiver circuit (e.g., may remain connected thereto irrespective of an operation mode). In this disclosure, the switch element may be referred to as a first switch element for ease of understanding.

Further, the power supply node may be connected to the receiver circuit via a DC/DC converter that is configured to receive a supply voltage from the power supply node, to convert the supply voltage to an operation voltage of the receiver circuit, and to output the operation voltage to the receiver circuit. In this embodiment, the photo-sensitive element is further connected to the latching element via the DC/DC converter. For example, the DC/DC converter is configured, in response to receiving the wake-up signal from the photo-sensitive element, to output the set signal to the latching element. In some embodiments, the DC/DC converter is a low drop-out regulator that allows for the performance of both of the aforementioned tasks while having minimal power consumption.

According to another embodiment of the control system, the wake-up unit further includes another switch element (e.g., a second switch element) that is interconnected between the power supply node and the DC/DC converter. In this embodiment, the photo-sensitive element is configured to set the second switch element conductive in response to receiving the wake-up light signal. For example, the energy content of the wake-up light signal need only be sufficient to set the second switch element to be conductive to provide the operation power from the power supply node to the DC/DC converter. In this embodiment, the DC/DC converter then outputs the set signal to the latching element while the DC/DC converter is connected to the power supply node via the second switch element. In response thereto, the latching element outputs the switch control signal to set the first switch element conductive to continuously supply power the DC/DC converter until a reset signal is received by the latching element to stop outputting the switch control signal.

Further, the switch element may be interconnected between the power supply node and the DC/DC converter, and the DC/DC converter may be configured to output the operation voltage to the receiver circuit while being connected to the power supply node via the first switch element. For example, the DC/DC converter may be configured such that it outputs a voltage to the receiver circuit only when it is connected to the power supply node via the first switch element and not while being connected to the power supply node via only the second switch element. This might be achieved by using different input nodes of the DC/DC converter when, for example, different input nodes are connected to different output nodes. For example, a first input node may be connected to the power supply node via the first switch element, and a corresponding first output node may be connected to the receiver circuit. Further, a second input node may be connected to the power supply node via the second switch element, and a corresponding second output node may be connected to the latching element.

Further, the reset signal for the latching element of the wake-up unit may function as (e.g., may be or may act as) the sleep signal for the slave control unit. According to this embodiment, the first switch element is configured to disconnect the receiver circuit from at least one of the power supply node and the photo-sensitive element in response to receiving the sleep signal. For example, the conductivity of the first switch element is fully controlled by the latching element. In some embodiments, the latching element sets the first switch element conductive in response to receiving a set signal and non-conductive in response to receiving a reset signal. In one embodiment, the reset signal is generated by the receiver circuit, for example, after a time (e.g., after a predetermined time) without receiving any reception signal from the photo-sensitive element.

In another embodiment, the control system includes a counter configured to start counting in response to the wake-up signal and to stop counting in response to a reception signal (e.g., a predetermined reception signal). For example, the counter is connected to the wake-up unit either directly or indirectly to receive the wake-up signal. In one embodiment, the counter is connected to the photo-sensitive element via the DC/DC converter. Hence, when the DC/DC converter supplies the operation voltage to the receiver circuit in response to the wake-up signal, the counter starts counting. For example, the counter may be configured to start counting in response to the first switch element being set conductive in response to receiving the switch control signal from the latching element. Also, the reception signal may be generated by the photo-sensitive element in response to receiving a light signal (e.g., a predetermined light signal) from the master control unit, and the light signal may be transmitted by the MCU to stop the counter from further counting.

In one embodiment, the control system further includes a capacitor connected to the power supply node, and the photo-sensitive element is configured to set the second switch element conductive in response to receiving the wake-up light signal and in response to the capacitor being fully charged (e.g., when both of the aforementioned conditions are met). For example, when the photo-sensitive element receives the wake-up light signal, first the capacitor is charged and, only when the capacitor is charged, the second switch element is set conductive to connect the power supply node to the DC/DC converter to generate the set signal for the latching element. The time for charging the capacitor of having a given capacity depends on the intensity of the light received by the photo-sensitive element. Hence, the combination of the counter and the capacitor allows for the intensity of the wake-up light signal received by the photo-sensitive element to be reliably measured. In some embodiments, all of the slave control units of the control system include a capacitor having the same capacity and receive the same wake-up light signal. Thus, the counter value (e.g., the counter value as a function of time) is indicative of a relative location of, such as a distance and/or obstructions between, the master control unit and the respective slave control unit. A method for waking-up of at least one slave control unit of the control system that utilizes the counter and the capacitor is described in more detail below.

Another embodiment of the present disclosure relates to a battery system including a plurality of battery modules, each having a plurality of stacked battery cells and a battery module monitor (BMM) configured to monitor the battery cells. The battery modules may be interconnected by module terminals. For example, each of the BMMs is configured to measure voltages, currents, and/or temperatures of the battery cells of the respective battery module and may be configured to perform cell balancing between the battery cells of the battery modules. In the context of the present disclosure, this definition of a battery module may indicate a complete battery module or a battery submodule (e.g., a battery module described here may be a battery submodule as described in the introduction). However, the battery module described herein may also include further components.

The battery system may further include a battery system monitor (BSM), which is configured to control the BMM of each battery module. The BMS may be configured to receive voltage data from the BMMs of all of the battery modules and to control the battery system as a whole. The BSM is may also be configured to provide a communication interface to an exterior of the battery system for communicating with electrical loads connected thereto. The battery system may further include a control system according to the present disclosure, in which the BSM is the master control unit and the BMMs are the slave control units. For example, the battery system does not include a master control unit and a BSM, but instead, the BSM is the master control unit in the control system according to embodiments of the present disclosure. Embodiments of the battery system correspond to the embodiments of the control system of the present disclosure as described in detail above and further described below.

A method according to an embodiment of the present disclosure relates to a method for waking-up of at least one slave control unit of the control system according to an embodiment of the present disclosure, such as to a method for waking-up at least one slave control unit including a counter as described above. A method, according to an embodiment of the present disclosure, includes receiving, via the photo-sensitive element, a first light signal from the light source and generating, in response to receiving the first light signal, a wake-up signal. For example, the first light signal may be the wake-up light signal as described above with respect to the control system. The method further includes starting, by the counter, to count in response to the wake-up signal and further includes connecting, by the wake-up unit, the receiver circuit to the power supply node and/or or the photo-sensitive element in response to the wake-up signal. The method further includes stopping, by the counter, to count in response to a reception signal (e.g., a predetermined reception signal) that is output from the photo-sensitive element to the receiver circuit, and the reception signal may be generated in response to receiving, via the photo-sensitive element, a second light signal. The method according to embodiments of the present disclosure allows a time between the generation of the wake-up signal in response to receiving the wake-up light signal and a second light signal to be determined, and the second light signal may be a light signal for stopping the counting operation. The method according to embodiments of the present disclosure allows for the addressing of the SCUs.

In an embodiment of the method, each of a plurality of slave control units includes a capacitor as described above. In this embodiment, the first light signal (e.g., the wake-up light signal) may be transmitted at a first time point and for a first duration. In each of the slave control units, the wake-up signal is output at a second time point during the first duration, the second time point being the time point when the capacitor of the respective slave control unit is fully charged. For example, in each slave control unit, the time point of outputting the wake-up signal depends on the energy content of the received first (or wake-up) light signal. According to this embodiment, the second light signal is transmitted at a third time point after the first duration, for example, after the transmission of the first (or wake-up) light signal has stopped. According to this embodiment, a second duration between the first time point and the second time point depends on a distance between the slave control unit and the master control unit, as the intensity of the transmitted first (or wake-up) light decreases as the distance between MCU and SCU increases. Further, in this embodiment, an identifier of the respective slave control unit is then determined based on the second duration, and such identifier is unique.

Another aspect of the present disclosure relates to an electric vehicle including a battery system according to an embodiment of the present disclosure as described above. The electric vehicle may be a fully electric vehicle or a hybrid vehicle. Further aspects of the present disclosure may be learned from the dependent claims and/or the following description.

BRIEF DESCRIPTION OF THE DRAWINGS

Aspects and features of the present disclosure will become apparent to those of ordinary skill in the art by describing, in detail, exemplary embodiments thereof with reference to the attached drawings, in which.

DETAILED DESCRIPTION

Figure 1:
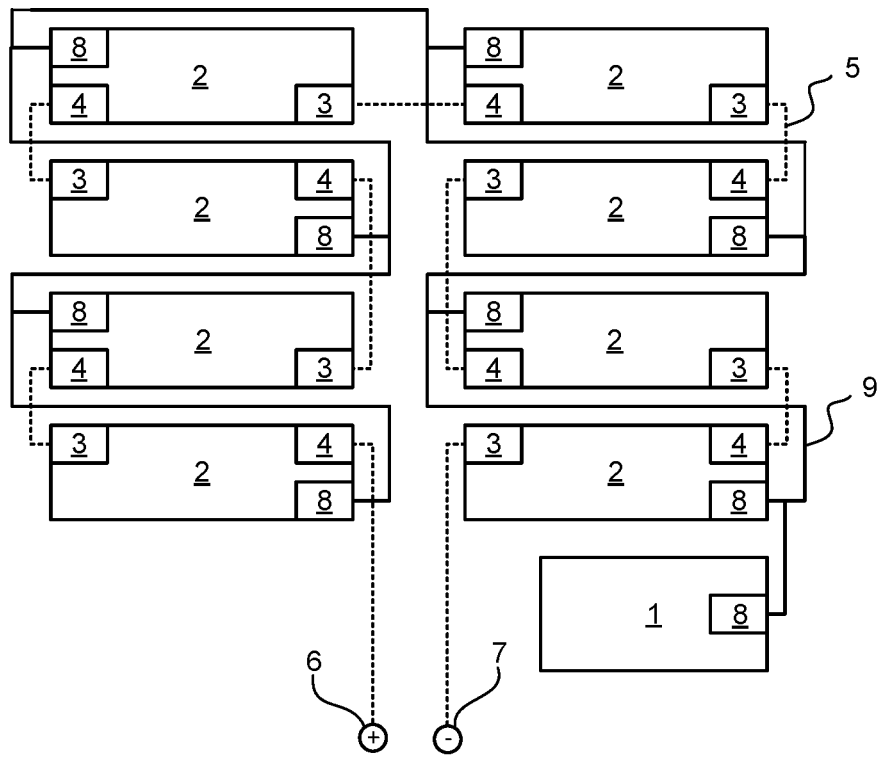
FIG. 1 is a schematic top view of a battery system according to the related art.

Reference will now be made, in detail to, embodiments, examples of which are illustrated in the accompanying drawings. Aspects and features of the exemplary embodiments, and implementation methods thereof, will be described with reference to the accompanying drawings. In the drawings, like reference numerals denote like elements and redundant descriptions thereof may be omitted, and the relative sizes of elements, layers, and regions may be exaggerated for clarity. The present disclosure, however, may be embodied in various different forms and should not be construed as being limited to the embodiments illustrated herein. Rather, these embodiments are provided as examples so that this disclosure will be thorough and complete and will fully convey the aspects and features of the present disclosure to those skilled in the art. Accordingly, processes, elements, and techniques that are not considered necessary for those having ordinary skill in the art to have a complete understanding of the features of the present disclosure may be omitted.

As used herein, the term "and/or" includes any and all combinations of one or more of the associated listed items. Further, the use of "may" when describing embodiments of the present disclosure refers to "one or more embodiments of the present disclosure." As used herein, the singular forms "a" and "an" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components but do not preclude the presence or addition of one or more other features, integers, steps, operations, elements, components, and/or groups thereof.

Expressions, such as "at least one of," when preceding a list of elements, modify the entire list of elements and do not modify the individual elements of the list. It will be understood that although the terms "first" and "second" are used to describe various elements, these elements should not be limited by these terms. These terms are only used to distinguish one element from another element. For example, a first element may be named a second element and, similarly, a second element may be named a first element, without departing from the invention. Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on," "connected to," or "coupled to" another element or layer, it may be directly on, connected, or coupled to the other element or layer or one or more intervening elements or layers may also be present. When an element or layer is referred to as being "directly on," "directly connected to," or "directly coupled to" another element or layer, there are no intervening elements or layers present. For example, when a first element is described as being "coupled" or "connected" to a second element, the first element may be directly coupled or connected to the second element or the first element may be indirectly coupled or connected to the second element via one or more intervening elements.

Spatially relative terms, such as "beneath," "below," "lower," "above," "upper," and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" other elements or features would then be oriented "above" or "over" the other elements or features. Thus, the term "below" may encompass both an orientation of above and below. The device may be otherwise oriented (rotated 90 degrees or at other orientations), and the spatially relative descriptors used herein should be interpreted accordingly.

As used herein, the term "substantially," "about," and similar terms are used as terms of approximation and not as terms of degree, and are intended to account for the inherent deviations in measured or calculated values that would be recognized by those of ordinary skill in the art. Further, if the term "substantially" is used in combination with a feature that can be expressed as a numerical value, the term "substantially" denotes a range of +/−5%.

FIG. 1 shows a daisy chain setup according to the related art and was described above.

Figure 2:
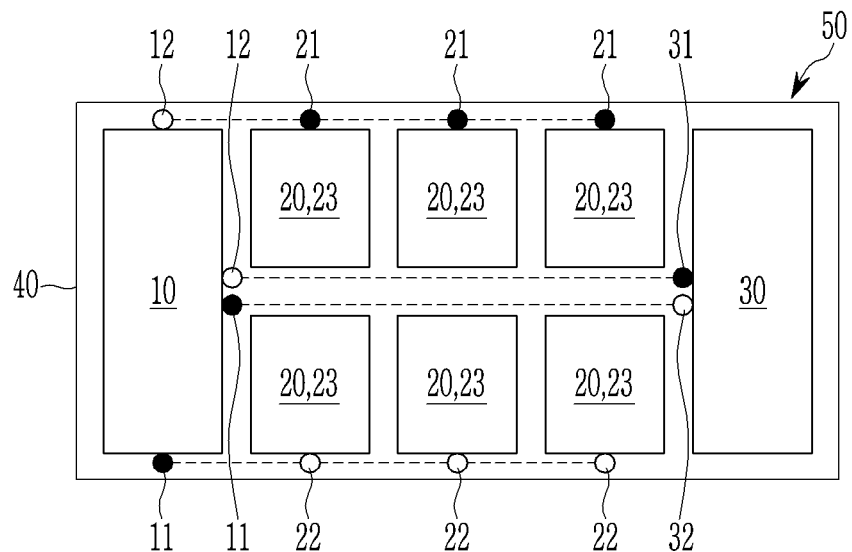
FIG. 2 is a schematic top view of a battery system according to an embodiment.

Referring to FIG. 2, a schematic top view of a battery system 50 according to an embodiment is shown. The battery system 50 includes a plurality of (e.g., six) battery modules 23, each including a battery module monitor (BMM) 20, which are disposed on top of each respective battery module 23. The battery system 50 further includes a battery system monitor (BSM) 10 and a battery disconnect unit (BDU) 30. The battery modules, BMM 20, BSM 10, and BDU 30 are disposed in a housing 40 that is at least laterally enclosing all of these components.

As can be further seen in FIG. 2, the BSM 10 includes a plurality of (e.g., two) optical transmitters 11 and a plurality of (e.g., two) optical receivers 12. With reference to the directions of FIG. 2, one optical transmitter 11 is arranged at a lower lateral side of the BSM 10 and is configured to perform forward communication with the plurality of BMMs 20 in a lower row of battery modules 23. Each BMM 20 includes an optical receiver 22 that is in direct line of sight with the optical transmitter (e.g., the lower optical transmitter) 11 of the BSM 10. As further shown in FIG. 2, an optical receiver 12 is arranged at an upper lateral side of the BSM 10 and is configured to perform backward communication with the plurality of BMMs 20 in an upper row of battery modules 23. Each BMM 20 includes an optical transmitter 21 that is in direct line of sight with the optical receiver (e.g., the upper optical receiver) 12 of the BSM 10. As further shown in FIG. 2, the BSM 10 includes another optical transmitter 11 and another optical receiver 12 that are disposed at a right lateral side of the BSM 10 and that are in direct line of sight with a corresponding optical receiver 32 and a corresponding optical transmitter 31 of a BDU 30. Further optical receivers are provided for backward communication with the lower row of the BMMs 20 and further optical transmitters are provided for forward communication with the upper row of the BMMs although these optical transmitters 21 and optical receivers 22 are not shown in FIG. 2.

Figure 3:
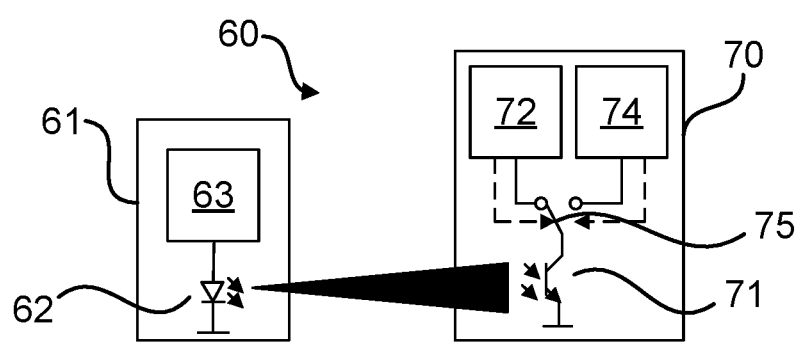
FIG. 3 illustrates a control system for a battery module according to an embodiment.

A control system 60, according to an embodiment, for a battery module 23 as shown in FIG. 2 is illustrated in FIG. 3. As illustrated therein, the control system 60 includes a master control unit (MCU) 61, which includes a light source (e.g., a light emitting diode) 62 and a transmission controller 63 that is configured to selectively operating the light source 62, for example, for turning the light source on and off to transmit a light signal. A transmission signal is encoded in and/or modulated to the light signal and, thus, is transmitted via the light signal.

The control system 60 further includes a slave control unit (SCU) 70, and, in some embodiments, includes a plurality of SCUs 70. FIG. 3 shows a single SCU 70 as an example. The SCU 70 includes a photo-sensitive element (e.g., a photo-sensitive transistor) 71. The photo-sensitive element 71 is configured to receive the light signal transmitted from the MCU 61. The SCU 70 further includes a wake-up unit (e.g., a wake-up circuit) 72, a receiver circuit 74, and a switch element (e.g., a switch) 75.

During a sleep mode of the SCU, the switch element 75 is connected to the wake-up unit 72 and is disconnected from the receiver circuit 74. In response to receiving a light signal from the MCU 61, such as a wake-up light signal, the photo-sensitive element 71 outputs a wake-up signal to the wake-up unit 72 via the switch element 75. In response to receiving the wake-up signal, the wake-up unit 72 operates the switch element 75 to connect the photo-sensitive element 71 to the receiver circuit 74 instead of to the wake-up unit 72 (as indicated by the left dashed line in FIG. 3). Therein, the wake-up unit 72 provides for a transition between a sleep mode and a normal operation mode. In the normal operation mode, the receiver circuit 74 receives a reception signal output by the photo-sensitive element 71 in response to receiving further light signals from the MCU 61, and the receiver circuit 74 is configured to demodulate and/or decode such reception signals. To transition back to the sleep mode, the receiver circuit 74 is configured to control the switch element 75 to connect the photo-sensitive element 71 to the wake-up unit 72 again (as indicated by the right dashed line in FIG. 3). In FIG. 3, the receiver circuit 74 is fixedly connected to a power supply node.

Figure 4:
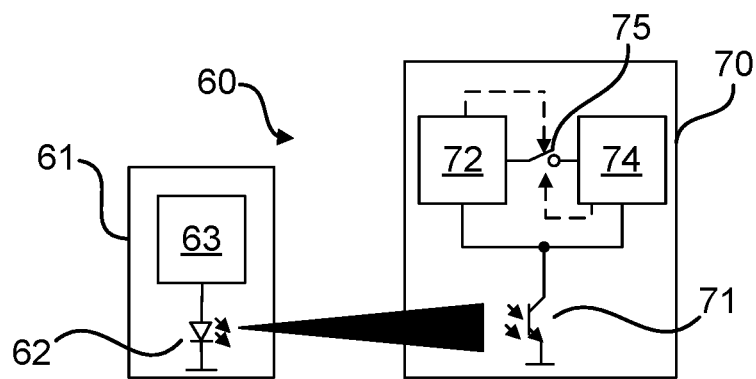
FIG. 4 illustrates a control system for a battery module according to an embodiment.

Another embodiment of the control system 60 for a battery module 23 as shown in FIG. 2 is illustrated in FIG. 4. Therein, the same reference signs as in FIG. 3 denote the same elements, and repeated descriptions thereof may be omitted. In the control system 60 shown in FIG. 4, the receiver circuit 74 and the wake-up unit 72 are fixedly (e.g., permanently) connected to the photo-sensitive element 71. Further, the wake-up unit 72 includes a power supply node. In a sleep mode of the SCU 70, a switch element 75 between the wake-up unit 72 and the receiver circuit 74 is set non-conductive. Hence, no operation voltage is supplied to the receiver circuit 74 such that it is not in an operational state. However, in response to receiving a wake-up signal from the photo-sensitive element 71 (generated therefrom in response to receiving a wake-up light signal from the MCU 61), the wake-up unit 72 sets the switch element 75 conductive (as indicated by the left dashed line in FIG. 4), and the power supply node, as part of the wake-up unit 72, is connected to the receiver circuit 74, which is thus provided with an operational voltage and, hence, is functional. In response to a sleep signal output by the receiver circuit 74 (as indicated by the right dashed line in FIG. 4), the switch element 75 is set non-conductive again and, hence, the receiver circuit 74 is again cut from (e.g., disconnected from) the power supply node.

Figure 5:
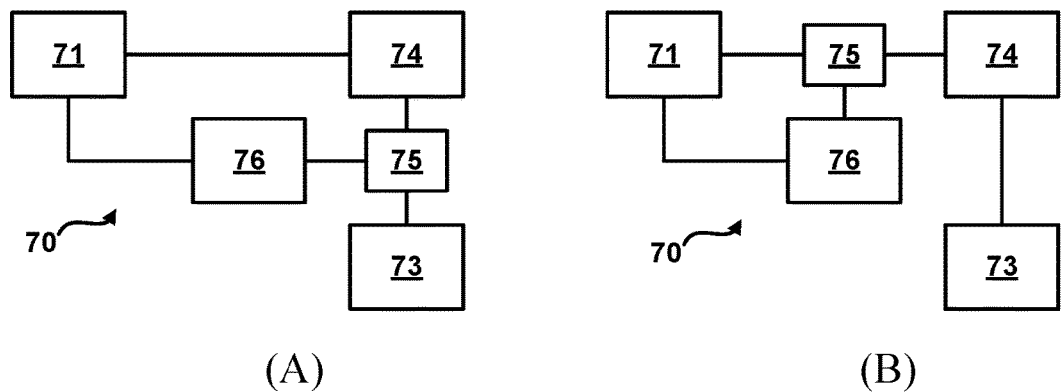
FIGS. 5(A) and 5(B) schematically illustrate slave control units for battery module according to embodiments.

Further embodiments of slave control units 70 are schematically illustrated in FIGS. 5(A) and 5(B). The slave control unit 70 includes the photo-sensitive element 71, the power supply node 73, the wake-up unit 72, which includes (or is formed by) the switch element 75 and a latching element 76, and the receiver circuit 74. According to embodiment shown in FIG. 5(A), the switch element 75 is interconnected between the power supply node 73 and the receiver circuit 74, as described above with respect to FIG. 4. Further, the switch element 75 is controlled by the latching element 76, which receives the wake-up signal from the photo-sensitive element 71 as described above. In response to receiving the wake-up signal, the latching element 76 sets the switch element 75 to be conductive and connects the power supply node 73 to the receiver circuit 74. Hence, the receiver circuit 74 is connected to the power supply node 73 and to the photo-sensitive element 71 and receives an operation voltage from the power supply node 73, receives reception signals from the photo-sensitive element 71, and is thus in a normal operation mode. In response to receiving a sleep signal as a reset signal, the latching element 76 sets the switch element 75 non-conductive, thus disconnecting the receiver circuit 74 and the power supply node 73 and putting the receiver circuit 74 and thus the SCU 70 to sleep mode.

In FIG. 5(B), the switch element 75 is interconnected between the photo-sensitive element 71 and the receiver circuit 74, as described above with respect to FIG. 3. The switch element 75 is controlled by the latching element 76, which receives the wake-up signal from the photo-sensitive element 71 as described above. In response to receiving the wake-up signal, the latching element 76 sets the switch element 75 to be conductive to connect the photo-sensitive element 71 to the receiver circuit 74. Hence, the receiver circuit 74 is connected to the power supply node 73 and to the photo-sensitive element 71, receives an operation voltage from the power supply node 73, receives reception signals from the photo-sensitive element 71, and, thus, is in normal operation mode. In response to receiving a sleep signal as reset signal, the latching element 76 sets the switch element 75 non-conductive, thus disconnecting the receiver circuit 74 and the photo-sensitive element 71 from each other and putting the receiver circuit 74 and, thus, the slave control unit 70 as whole into sleep mode.

Figure 6:
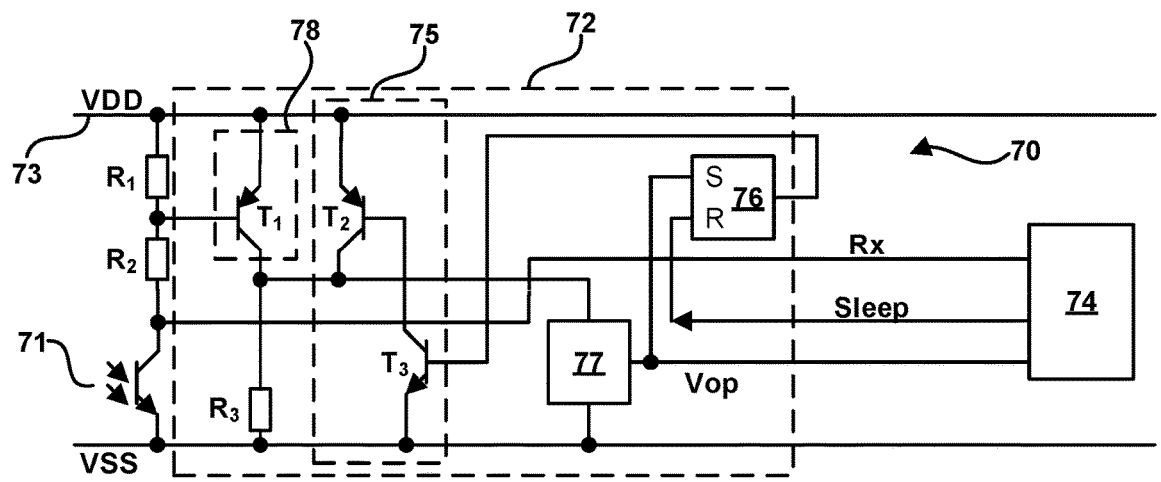
FIG. 6 is a circuit diagram for a slave control unit according to an embodiment.

A circuit diagram of a slave control unit 70 according to an embodiment is illustrated in FIG. 6. The switch element 75 is interconnected between the power supply node 73 and the receiver circuit 74, and thus, the circuit diagram in FIG. 6 corresponds to the embodiment shown in FIG. 5(A). According to FIG. 6, a wake-up unit 72 includes a (first) switch element 75, a latching element 76, a DC/DC converter 77, and another (second) switch element 78. The photo-sensitive element 71 is, in this embodiment, a photo-sensitive transistor, and is interconnected between a ground voltage VSS and the power supply node 73, which provides supply voltage VDD. A voltage divider formed by resistors R1 and R2 is interconnected between a drain of the photo-sensitive transistor 71 and the power supply node 73, and an output of the voltage divider R1/R2 is provided to the gate of transistor 78 as the other (second) switch element 78 interconnected between the power supply node 73 and the DC/DC converter 77. When the photo-sensitive transistor 71 receives the wake-up light signal, the photo-sensitive transistor 71 sets the (second) switch element 78 to be conductive. Hence, the supply voltage VDD is provided to a first input of the DC/DC converter 77, and the DC/DC converter 77 outputs a set signal to the latching element 76 in response. The latching element 76 outputs a switch control signal to the first switch element 75, which is formed by transistors T2 and T3, particularly to the transistor T3, which in response sets transistor T2 to be conductive. The supply voltage VDD is provided to an input of the DC/DC converter 77 via the transistor T2, which therefore outputs an operation voltage $V_{OP}$ to the receiver circuit 74. The receiver circuit 74 further receives a reception signal Rx from the photo-sensitive transistor 71 and is, thus, in normal operation mode. To transition to sleep mode, the receiver circuit 74 outputs a sleep signal as a reset signal to the latching element 76, which thus stops outputting the switch control signal to the third transistor T3. Hence, the supply voltage VDD is no longer provided to the DC/DC converter 77, and the operation voltage $V_{OP}$ is no longer provided to the receiver circuit 74.

Figure 7:
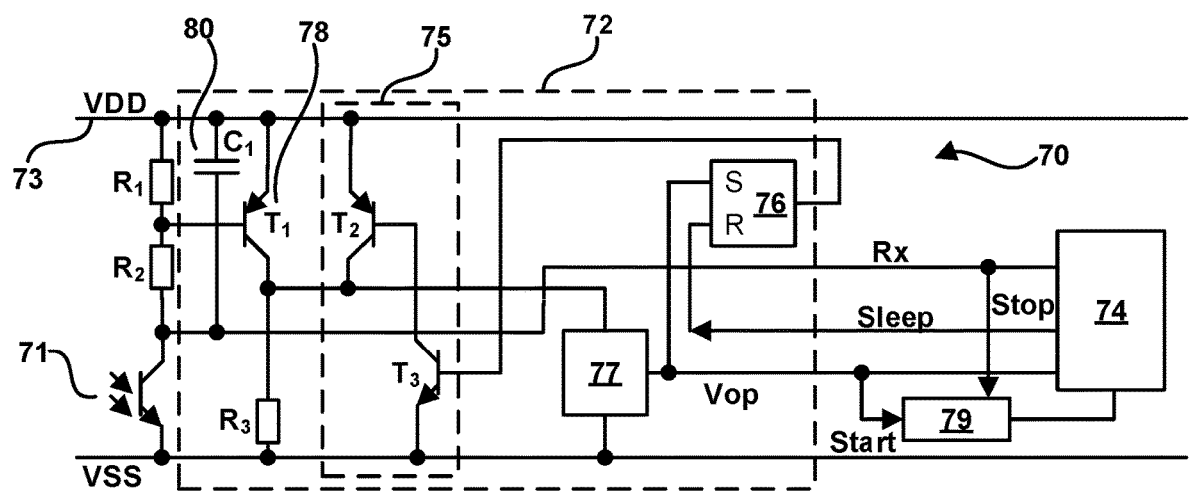
FIG. 7 is a circuit diagram for a slave control unit according to an embodiment.

A similar circuit diagram of a slave control unit 70 according to another embodiment is schematically illustrated in FIG. 7. The same reference signs in FIG. 7 denote the same elements as in FIG. 6, and repeated descriptions thereof may be omitted. The SCU 70 shown in FIG. 7 further includes a counter 79 that is interconnected between the DC/DC converter 77 and the receiver circuit 74 to receive a start signal when the DC/DC converter 77 starts to provide the operation voltage $V_{OP}$ to the receiver circuit 74. The counter 79 is further interconnected between the photo-sensitive transistor 71 and the receiver circuit 74 to receive a stop signal when the photo-sensitive transistor 71 outputs a reception signal (e.g., a predetermined reception signal) Rx to the receiver circuit 74. The counter 79 is further connected to the receiver circuit 74 to provide a counting result to the receiver circuit 74. The SCU 70 shown in FIG. 7 further includes a capacitor 80 interconnected between the photo-sensitive transistor 71 and the power supply node 73.

Figure 8:
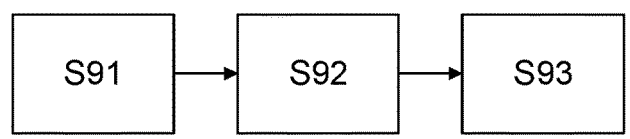
FIG. 8 illustrates a wake-up method according to an embodiment.
Figure 9:
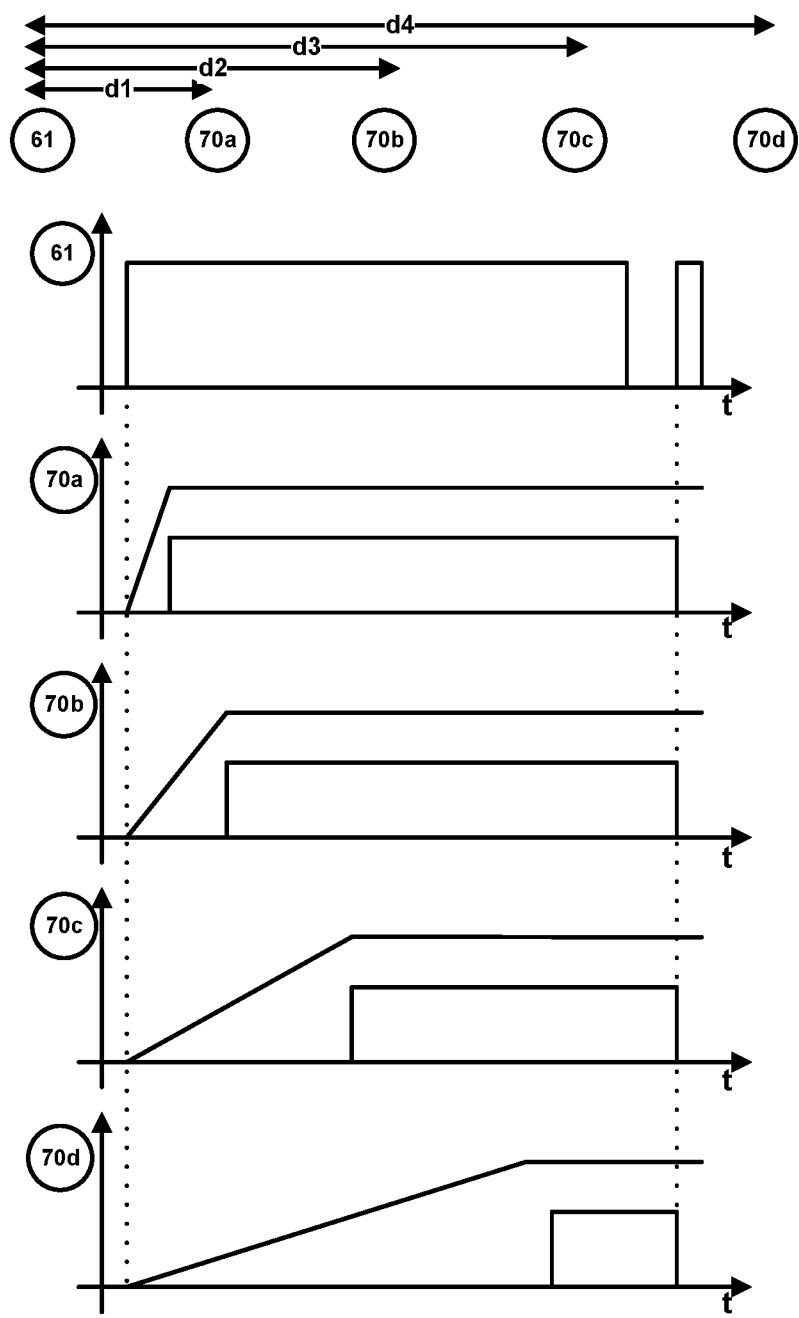
FIG. 9 illustrates a wake-up and addressing method according to an embodiment.

A wake-up method of the slave control unit 70 as illustrated in FIG. 7 is illustrated with respect to FIGS. 8 and 9. The wake-up method is performed in a control system 60 as schematically illustrated in the top part of FIG. 9 and utilizes one master control unit 61 and four slave control units 70a, 70b, 70c, 70d. The first SCU 70a is positioned at a distance d1 from the MCU 61, the second SCU 70b is positioned at a distance d2 from the MCU 61, the third SCU 70c is positioned at a distance d3 from the MCU 61, and the fourth SCU 70d is positioned at a distance d4 from the MCU 61, and the distance d1 is smaller than the distance d2, the distance d2 is smaller than the distance d3, and the distance d3 is smaller than the distance d4.

In a first step S91 of the wake-up method, a first wake-up light signal is emitted by the MCU 61 at a first time point and for a first duration as a square wave signal as illustrated in the uppermost plot of FIG. 9. As illustrated by the left dotted line, the first light signal emitted is received by the photo-sensitive elements 71 of all of the SCUs 70a to 70d. As illustrated in FIG. 7, when the first wake-up light signal is received by the photo-sensitive elements 71, the corresponding capacitor 80 is charged by the power supply node 73 and only after the capacitor 80 is charged, and the another (second) switch element 78 is set conductive to provide the supply voltage VDD to the DC/DC converter 77. Hence, in each slave control unit 70a to 70d, the wake-up signal is output at a different second time point during the first duration when the capacitor 80 of the respective slave control unit 70a to 70d is fully charged. This is illustrated in the plots regarding SCUs 70a to 70d in FIG. 9 as the time point when the increasing slope reaches a plateau (e.g., when the capacitor 80 is fully charged) and when the respective wake-up signal is generated.

In response to the generation of the respective wake-up signals, the counter 79 of the respective SCU 70a to 70d starts counting in step S92, which is illustrated as square wave signals in FIG. 9 for each of the SCUs 70a to 70d. Therein, the counter 79 runs for the longest time for SCU 70a, which is the closest to the MCU 61, and the counter 79 runs for the shortest time for SCU 70a, which is most distant from the MCU 61. At the same time (or concurrently), when the wake-up signal is generated, e.g., when the increasing slope reaches a plateau (e.g., when the capacitor 80 fully charged), the wake-up unit connects the receiver circuit 74 to the power supply node 73 via the first switch element 75, which is operated by the latching element 76 receiving a set signal from the DC/DC converter 77. Hence, the receiver circuits 74 of the SCUs 70a to 70d are in normal operation mode.

As further illustrated in the plot of FIG. 9, the MCU 61 outputs a second light signal at a third time point after the first duration. As further illustrated in the plots of FIG. 9 regarding the SCUs 70a to 70d, the counter 79 is stopped in step S93 in response to the receiver circuit 74 receiving the reception signal (e.g., the predetermined reception signal) that is output from the photo-sensitive element 71 in the receiver circuit 74 in response to receiving, via the photo-sensitive element 71, the second light signal. Further, at this time, the counter 79 value corresponding to the integral of the square wave signal in the respective plots of SCUs 70a to 70d in FIG. 9 is transmitted from the counter 79 to the receiver circuit 74.

In one embodiment, the distance d1 is about 30 cm, the distance d2 is about 60 cm, the distance d3 is about 90 cm, and the distance d4 is about 120 cm. The energy of the first wake-up light signal received by the respective SCUs 70a to 70d depends reciprocally on (or is varied according to) the distance, and hence, the current through photo-sensitive transistor 71 in the SCU 70a exceeds the current through the photo-sensitive transistor 71 in the SCU 70b, 70c, and 70d, etc. Hence, the wake-up signal is generated earliest in the SCU 70a, and hence, the counter value of the SCU 70a has the highest value, such as 21 for SCU 70a, 18 for SCU 70b, 11 for SCU 70c, and 6 for SCU 70d. These counter values correspond, for each of the SCUs 70a to 70d, to a second duration between the first time point and the second time point and to the distance between the respective SCU 70a to 70d and the MCU 61. In one embodiment embodiment, an identifier of the SCUs 70a to 70d is determined based on the second duration, e.g., is based on the counter value. Therefore, in such an embodiment, the counter values are transmitted from the SCUs 70a to 70d to the MCU 61, and the MCU 61 assigns individual identifiers to the SCUs 70a to 70d based on the counter values.

In following communications, the MCU 61 transmits the identifier and the underlying counter value to identify the SCU 70a to 70d to which a certain communication is directed. Then, the SCUs 70a to 70d compare the counter value received from the MCU 61 with its internal counter value, which is either stored or generated during a subsequent wake-up. If the counter values match, the SCUs 70a to 70d store the respective identifier transmitted by the MCU 61 together with the counter value as their own address for further communication. To ensure that addressing remains valid even for upcoming (or subsequent) wake-ups, the counter values may have an uncertainty interval, in which the counter values are assigned to the same identifier and hence variations in photon-flux etc. can be accounted for.

The electronic or electric devices and/or any other relevant devices or components according to embodiments of the present disclosure described herein may be implemented utilizing any suitable hardware, firmware (e.g., an application-specific integrated circuit), software, or a combination of software, firmware, and hardware. For example, the various components of these devices may be formed on one integrated circuit (IC) chip or on separate IC chips. Further, the various components of these devices may be implemented on a flexible printed circuit film, a tape carrier package (TCP), a printed circuit board (PCB), or formed on one substrate. The electrical connections or interconnections described herein may be provided (or realized) by wires or conducting elements, for example, on a PCB or on another kind of circuit carrier. The conducting elements may include metallization, such as surface metallizations, and/or pins and/or may include conductive polymers or ceramics. Further, electrical energy might be transmitted via wireless connections using, as some examples, electromagnetic radiation and/or light.

Further, the various components of these devices may be a process or thread running on one or more processors in one or more computing devices executing computer program instructions and interacting with other system components for performing the various functionalities described herein. The computer program instructions are stored in a memory, which may be implemented in a computing device using a standard memory device, such as, for example, a random access memory (RAM). The computer program instructions may also be stored in other non-transitory computer readable media, such as, for example, a CD-ROM, flash drive, or the like.

Also, a person of skill in the art should recognize that the functionality of various computing devices may be combined or integrated into a single computing device, or the functionality of a particular computing device may be distributed across one or more other computing devices without departing from the spirit and scope of the present disclosure.

SOME REFERENCE NUMERALS 1 battery system monitor (BSM)
2 battery module monitor (BMM)
3 negative module terminal
4 positive module terminal
5 busbar
6 positive battery system terminal
7 negative battery system terminal
8 connector
9 wiring harness
10 battery system monitor (BSM)
11 optical transmitter of the BSM
12 optical receiver of the BSM
20 battery module monitor (BMM)
21 optical transmitter of the BMM
22 first/second optical receiver of the BMM
23 battery module
30 battery disconnect unit (BDU)
31 optical transmitter of the BDU
32 optical receiver of the BDU
40 battery system housing
50 battery system
60 control system
61 master control unit
62 light source
63 transmission controller
70 slave control unit
71 photo-sensitive element
72 wake-up unit
73 power supply node
74 receiver circuit
75 first switch element
76 latching element
77 DC/DC converter
78 second switch element
79 counter
80 capacitor

The invention claimed is:

1. A control system for a battery system, the control system comprising a master controller and a slave controller configured to perform light-based communication with each other,
wherein the master controller comprises a light source and a transmission controller configured to selectively operate the light source to emit light signals,
wherein the slave controller comprises a photo-sensitive element, a wake-up circuit, a power supply node, and a receiver circuit,
wherein the photo-sensitive element is configured to receive the light signals emitted by the light source and, in response to receiving a wake-up light signal, to output a wake-up signal to the wake-up circuit,
wherein, in response to receiving the wake-up signal from the photo-sensitive element, the wake-up circuit is configured to connect the receiver circuit to the power supply node or to the photo-sensitive element, and
wherein, when the receiver circuit is connected to the power supply node and the photo-sensitive element, the receiver circuit is configured to receive an operation voltage from the power supply node and to receive reception signals from the photo-sensitive element.

2. The control system according to claim 1, wherein the wake-up circuit comprises a first switch element and a latching element,
wherein the photo-sensitive element is configured to output a set signal as wake-up signal to the latching element in response to receiving the wake-up light signal,
wherein the latching element is configured to set the first switch element to be conductive in response to receiving the set signal from the photo-sensitive element, and
wherein the first switch element is interconnected between the receiver circuit and one of the photo-sensitive element and the power supply node.

3. The control system according to claim 2, wherein the other one of the photo-sensitive element and the power supply node is permanently connected to the receiver circuit.

4. The control system according to claim 3, wherein the power supply node is connected to the receiver circuit via a DC/DC converter, and
wherein the photo-sensitive element is connected to the latching element via the DC/DC converter.

5. The control system according to claim 4, wherein the wake-up circuit further comprises a second switch element interconnected between the power supply node and the DC/DC converter,
wherein the photo-sensitive element is configured to set the second switch element to be conductive in response to receiving the wake-up light signal, and
wherein, when the DC/DC converter is connected to the power supply node, the DC/DC converter is configured to output the set signal to the latching element.

6. The control system according to claim 5, wherein the first switch element is interconnected between the power supply node and the DC/DC converter, and
wherein the DC/DC converter is configured to output the operation voltage to the receiver circuit.

7. The control system according to claim 6, wherein a reset signal for the latching element is a sleep signal, and
wherein the first switch element is configured to disconnect the receiver circuit from the power supply node or from the photo-sensitive element in response to receiving the sleep signal.

8. The control system according to claim 7, wherein the reset signal is generated by the receiver circuit.

9. The control system according to claim 5, further comprising a counter configured to start counting in response to the wake-up signal and to stop counting in response to one of the reception signals.

10. The control system according to claim 9, wherein the counter is configured to start counting in response to the first switch element being set to be conductive.

11. The control system according to claim 10, further comprising a capacitor connected to the power supply node,
wherein the photo-sensitive element is configured to set the second switch element to be conductive in response to receiving the wake-up light signal and the capacitor being fully charged.

12. A method for waking-up the slave controller of the control system according to claim 9, the method comprising:

receiving, via the photo-sensitive element, a first light signal from the light source and generating, in response to receiving the first light signal, a wake-up signal;

in response to the wake-up signal, starting, by the counter, counting and connecting, by the wake-up circuit, the receiver circuit to the power supply node and/or the photo-sensitive element; and stopping, by the counter, counting in response to the one of the reception signals output from the photo-sensitive element to the receiver circuit in response to receiving, via the photo-sensitive element, a second light signal.

13. The method according to claim 12 for waking-up a plurality of the slave controllers of the control system, the control system further comprising a capacitor connected to the power supply node, and the photo-sensitive element being configured to set the second switch element to be conductive in response to receiving the wake-up light signal and the capacitor being fully charged, wherein the first light signal is transmitted at a first time point for a first duration, wherein, in each of the slave controllers, the wake-up signal is output at a second time point during the first duration when the capacitor of the respective slave controllers is fully charged, and wherein the second light signal is transmitted at a third time point after the first duration.

14. The method according to claim 13, wherein, for each of the slave controllers, a second duration between the first time point and the second time point depends on a distance between the slave controller and the master controller, and an identifier of the slave controller is determined based on the second duration.

15. A battery system comprising:

a plurality of battery modules, each of the battery modules comprising a plurality of stacked battery cells and a battery module monitor (BMM) configured to monitor the battery cells;

a battery system monitor (BSM) configured to control each of the BMMs; and the control system according to claim 1, wherein the BSM is the master controller, and the BMMs are the slave controllers.

* * * * *